March 14, 1933. C. W. MARSH 1,901,606
OIL SEAL
Filed Aug. 3, 1931 2 Sheets-Sheet 1
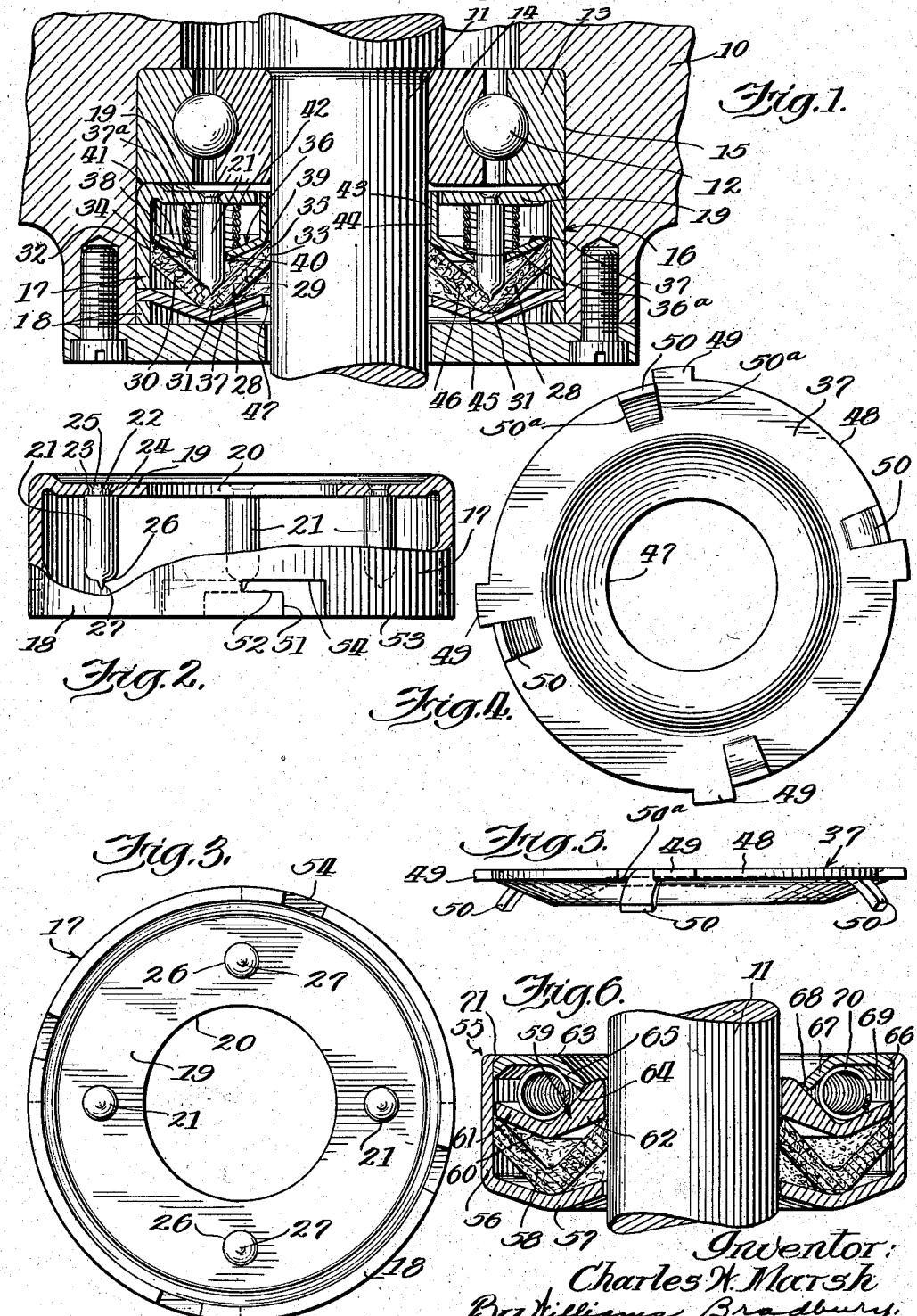

March 14, 1933.  C. W. MARSH  1,901,606
OIL SEAL
Filed Aug. 3, 1931  2 Sheets-Sheet 2
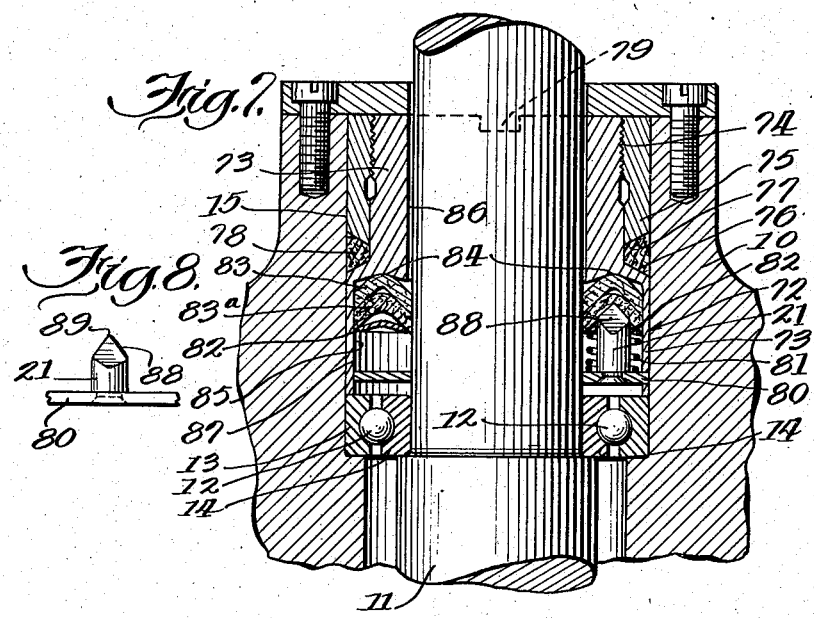
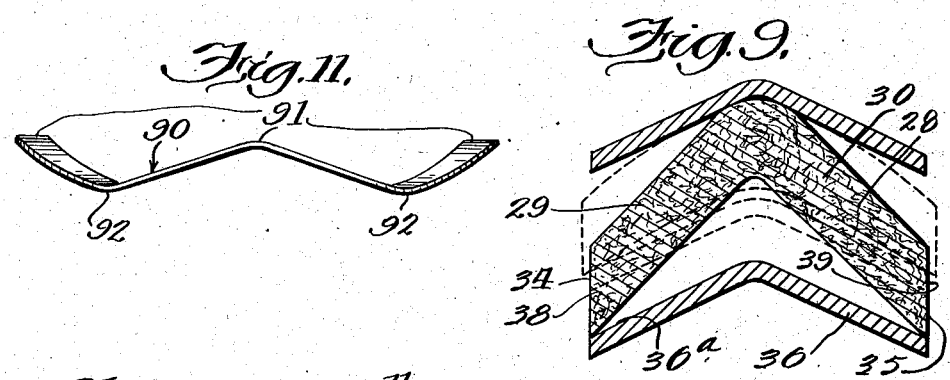
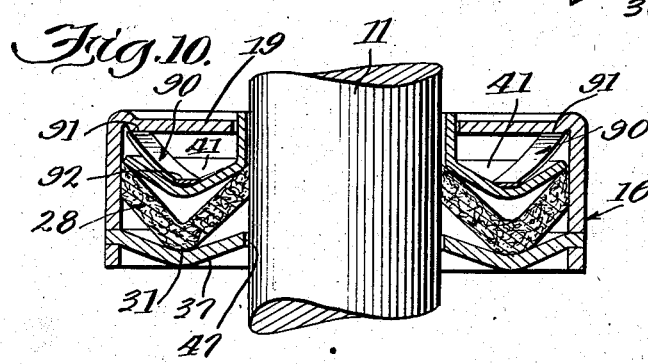
Inventor:
Charles W. Marsh
By Williams, Bradbury,
McCaleb & Hinkle, Attys.

Patented Mar. 14, 1933

1,901,606

UNITED STATES PATENT OFFICE

CHARLES W. MARSH, OF MUSKEGON, MICHIGAN

OIL SEAL

Application filed August 3, 1931. Serial No. 554,841.

The present invention relates to oil seals of the type adapted to be used about a shaft to prevent the leakage of lubricant along the shaft, but the present devices are also of general application and may be utilized for many other purposes.

One of the objects of the invention is the provision of an improved oil seal which is adapted to give long continuous service without necessity for repair, by virtue of the provision of a means for automatically compensating for the wear of the parts of the oil seal.

Another object of the invention is the provision of an improved oil seal adapted to eliminate any possibility of metallic parts of the seal wearing through the packing or otherwise coming in contact with the moving shaft.

Another object of the invention is the provision of an improved oil seal peculiarly adapted to withstand considerable wear and usage and adapted to automatically take up the wear and compensate for the same throughout a long life of service.

Another object of the invention is the provision of an improved oil seal in which the packing may be removed and conveniently replaced, thereby facilitating the maintenance of the seal in the best condition at all times.

Another object of the invention is the provision of an improved oil seal which may be cheaply manufactured and installed by virtue of the fact that most of the parts of the seal lend themselves readily to manufacture by stamping operations.

Another object of the invention is the provision of a plurality of modifications of my improved oil seal, each one of which has advantages which are the result of the particular construction of such modification.

Other objects and advantages of the invention will be apparent from the following description and from the accompanying drawings, in which similar characters of reference indicate similar parts of the several views.

Referring to the drawings, of which there are two sheets,

Fig. 1 is a sectional view taken on a plane passing through the axis of the oil seal and shaft, showing one exemplary installation of my oil seal;

Fig. 2 is a similar view in partial section and partial elevation, showing the casing for the oil seal of Fig. 1;

Fig. 3 is a plan view of the inside of the casing of Fig. 2;

Fig. 4 is a plan view of the cover or external expansion rim;

Fig. 5 is a side elevation of the cover before assembly;

Fig. 6 is a view similar to Fig. 1 of a modified form of oil seal, the parts of which are permanently secured together;

Fig. 7 is a view similar to Fig. 1 of another form of my oil seal, in which the oil seal is removable from the machine on which it is used;

Fig. 8 is a fragmentary view of one of the packing supporting studs used in Fig. 7;

Fig. 9 is an enlarged sectional view of one of the V-shaped packings and expanding members showing in dotted lines the mode of expansion of the packings into edgewise engagement with the adjacent parts;

Fig. 10 is a sectional view similar to Fig. 6 of a modified form of oil seal having a different type of spring, by means of which the oil seal may be made more compact; and Fig. 11 is a side elevational view of the spring utilized in the oil seal of Fig. 10.

Referring to Fig. 1, 10 indicates the frame or casing of a machine upon which the present oil seal is used, such as, for example, an electric motor having a shaft 11 which is rotatably mounted upon the ball bearings 12 located in the races 13 and 14. The race 13 is fixedly secured in the bore 15 of the frame 10 and the numeral 16 indicates one of the improved oil seals in its entirety.

In the installation which has been selected to illustrate the invention, only one oil seal 16 is employed, but it should be understood that Fig. 1 is merely a fragmentary view and similar oil seals may be used upon both sides of the anti-friction bearings for confining lubricant about the bearings, and the lubricant may be supplied by packing the bearings during installation or by the use of standard high pressure fittings. The installation shown is merely exemplary of one of the many modes of use of my improved oil seals.

The oil seal 16 is preferably provided with a casing 17, preferably stamped out of sheet metal such as steel, and formed with a substantially cylindrical flange 18 and a radially extending flange 19.

The radially extending flange 19 is provided with an aperture 20 which is definitely larger than the size of shaft 11, and the casing 17 is preferably fixedly secured in the bore 15 in such a manner that the edges of the flange 19 or any other metallic parts of the oil seal cannot come in contact with the shaft 11. The cylindrical part 18 of the casing 17 is preferably ground to fit in the bore 15, forming a liquid tight joint, and the casing 17 is pressed into close frictional engagement with the walls of the bore 15 in the embodiment of Fig. 1.

The radial flange 19 is preferably provided with three or more packing supporting studs 21 symmetrically supported by the flange 19 and projecting into the interior of casing 17. Each of the studs 21 is provided with reduced cylindrical end 22 forming an annular shoulder 23, and the flange 19 is provided with apertures 24 for receiving the reduced ends 22. The flange 19 may thus be confined between the annular shoulder 23 on each stud 21 and the riveted end 25 of the stud.

In the embodiment of Fig. 1 each of the studs 21 is preferably provided with a rounded end 26 and a relatively sharp point 27. The point 27 is adapted to penetrate into the body of the V-shaped leather packing 28, the amount of penetration being limited by the rounded portion or shoulder 26. The studs 21 thus hold the packing 28 in a predetermined position with respect to the other parts and positively prevent the turning of the packing 28 with the shaft 11.

The packing 28 preferably consists of a closed molded leather ring of substantially V-shape in cross section.

The molded packing 28 may in some embodiments consist of a plurality of spiral turns of V-shaped packing, or in some cases a multiplicity of rings may be used, each ring nesting in the other and forming a member of substantially the same shape as 28, but consisting of a plurality of separate layers.

Each of the packing rings 28 is provided with a pair of frusto-conical flanges 29, 30, the flanges 29 and 30 being joined together at the apex 31 along the line of a circle. The edges 32, 33 of the packing 28 are preferably beveled off, forming relatively sharp lips 34, 35, which are sufficiently flexible to be forced into closer engagement with the shaft 11 by any pressure which may exist inside the packing 28.

By virtue of the construction and arrangement of the packing 28 and a pair of expansion members 36, 37, the packing 28 is peculiarly adapted to be fed edgewise into engagement with the interior of the casing 17 and the external surface of shaft 11.

The internal expansion member 36 preferably consists of a stamped sheet metal member which is formed with a convex surface 36a which is of less curvature than the inside of the packing 28. That is, the convex annular surface 37a comes into initial engagement with the flanges 29, 30 of packing 28 at the points 38, 39 adjacent the outer edges of the packing inside the lips 34 and 35. The expansion member 36 is provided with a plurality of apertures 40 located to receive the studs 21 and the expansion member 36 is slidably mounted on the studs 21. Interposed between the upper side 41 of expansion member 36 and the radial flange 19 are a plurality of helical compression springs 42.

The compression springs 42 may likewise be mounted on the studs 21 and they are adapted to urge the expansion member 36 into engagement with the packing 28.

It is also desirable to form the expansion member 36 with an axially extending annular flange 43 of substantially tubular shape having a bore 44 which is larger than the shaft 11 by such an amount that the parts of the metal flange 43 never come into contact with shaft 11. The flange 43 serves to enclose the springs 42 and prevent access of dirt to the parts of the oil seal before its installation.

The expansion member 37 preferably comprises a stamped sheet metal member having an annular concave surface 34 which is of less angularity than the external surface 46 of the packing 28. That is, the curved annular surface 34 initially engages the apex 31 of the packing 28 and holds the packing against the surfaces 26 on studs 21. The expansion member 37 is provided with a centrally located aperture 47 which is slightly larger than shaft 11 and the expansion member 37 is formed with an outer circular edge 48 so that it may act as a cover for the casing 17. The expansion member or cover 37 is thus adapted to be slid inside the casing 17 and it is preferably secured in place by means of devices which permit the removal of the cover so that the packing may be renewed if necessary.

For this purpose the cover 37 may be provided with a multiplicity of radially projecting ears or lugs 49, 50 preferably symmetrically located about the circular edge 48 and adapted to register with the corresponding axial slots 51 in casing 17. The ears 50 are provided with slits 50a on each side to permit their being bent out of the plane of the cover. The casing 17 is provided with axial slots 51 corresponding to the ears 50 and with circumferentially extending slots 52 communicating with the slots 51 and adapted to receive the lugs 49.

The relation of these parts is such that when the cover 37 is placed on the end of casing 17 the lugs 49 pass into the axially extending slots 51 in the casing 17.

The ears 50 are preferably bent outward, as shown in Fig. 5, in such a manner that the ears 50 are adapted to pass the cylindrical wall 18 of casing 17 when the cover is shoved into the casing. For example, the cover 37 of Fig. 4 would be turned around and the lug 49 at the top inserted into slot 51, the other lugs finding corresponding slots. The ear 50 would be located inside the casing 17 adjacent the point 53 and ear 50 would pass inside the casing 17 by virtue of the fact that the ears 50 are bent over to an amount shown in Fig. 5.

When the lugs 49 have reached the bottoms 54 of slots 51, the cover 36a may be rotated counter clockwise in Fig. 2, and the lugs 49 pass into the circumferential slots 52 which retain the cover in place against axial movement. The ears 50 may then be bent upward from the position of Fig. 5 until the ears 50 engage inside the slots 51, thereby preventing rotation of the cover 36a relative to casing 17. At any time, however, a screw driver or other implement may be inserted below the ears 50 and the ears pried upward out of the slots 51 to permit rotation of cover 37, removal of the cover and replacement of the packing. In order to facilitate this removal the ears 50 are preferably not pushed all the way down into slots 51, but merely far enough to engage the sides of the slots and still leave enough room for insertion of the screw driver at some later date.

Referring to Fig. 9, this is an illustration of the action of the expansion members on the expansible V-shaped packing 28. The springs 42 force the internal expansion member 36 against the packing at the points 38 and 39, forcing the lips 34 and 35 outward and forcing the flanges 29 and 30 outward into engagement with the inner wall of the casing surface of the shaft 11. The points 27 on the studs 21 prevent any rotation of the packing 28 and the external expansion member 36a holds the apex of the packing against axial movement. The leather packing 28 is thus fed edgewise into engagement with the shaft 11, and as fast as the edge of the packing wears off a new surface is presented and the springs 42 and expansion members keep the leather packing 28 in continuous oil tight engagement with the shaft 11.

Referring to Fig. 9, the dotted line position of the packing 28 is an illustration of the feeding action of the expansion members on the V-shaped packing. This feeding action continues as long as the flanges 29 and 30 of the leather packing are wider than the space within which they are forced by the expansion members and the present oil seal is therefore adapted to compensate for wear and continuously maintain an oil tight or liquid tight joint about the shaft 11.

Referring to Fig. 6, this is a view similar to Fig. 1 of a modification in which the parts of the oil seal are permanently secured together. The oil seal of Fig. 6, which is indicated in its entirety by the numeral 55, is likewise provided with a sheet metal casing having a cylindrical flange 56 and an outer expansion flange 57 which is similar in form to the shape of the cover 36a previously described. The V-shaped packing 58 of this embodiment is similar to the packing 28 previously described and it cooperates with the expansion member 57 in a similar manner.

The internal expansion member 59 may be formed by casting and it consists of an annular member which is formed with the annular convex surface 60 similar to the internal expansion ring previously described. The expansion member 59 thus consists of two substantially frusto-conical flanges 61, 62, but the flange 62 is made substantially thicker in order to close the space between the cover 63 and the expansion member 59. The expansion member 59 engages the packing 58 at points adjacent the outer edges of the packing inside the flanges of the packing and forces the flanges of the packing into engagement with the casing 56 and shaft 11 in the same manner as previously described.

The thick flange 62 of the expansion member 59 is formed with a frusto-conical camming surface 64 which is substantially similar in shape to another frusto-conical camming surface 65 formed on the inside of the cover 63. The cover 63 comprises a stamped sheet metal member of circular shape which is preferably provided with a downwardly turned flange 66 at its border and with the frusto-conical flange 67 surrounding the centrally located aperture 68. The frusto-conical flange 67 has the camming surface 65 and the thickened flange 62 of the expansion member 59 cooperates with the aperture 68 to substantially close this part of the casing forming a spring chamber 69.

A garter spring 70, which preferably comprises a helical spring having its ends joined, is located in the spring chamber 69, and the spring 70 is tensioned against the frusto-conical surfaces 64, 65. The cover 63 is preferably a close frictional fit inside the wall 56 of the casing and the upper edge 71 of the casing wall 56 is preferably spun over to secure the cover 63 in place.

The operation of this oil seal is as follows: The tension of the garter spring 70 tends to cause the contraction of the spring 70 into the V-shaped opening between the flanges 67 and 62. Spring 70 thus tends to cam the surfaces 64 and 65 apart and urges the expansion member 59 in an axial direction against the flanges of the leather V-shaped packing 58. The leather packing is thus continuously expanded and fed edgewise into engagement with the shaft 11 and the wear of the leather packing is thus continuously taken up and an oil and water tight joint is constantly maintained about the shaft 11.

This oil seal 55 also preferably has its outer surface ground to fit in the bore about the shaft, and while the packing is not renewable without taking the oil seal apart, the amount of expansion attained by this packing and its expanders is such that the oil seal is capable of performing its functions for substantially the full life of the machinery upon which it is used.

Referring to Fig. 7, this is a modification in which the outer surface of an oil seal need not be ground to produce a fit in the bore adjacent the bearing with which it is used. In this embodiment the machine 10 is provided with a similar bearing and the bore 15 is adapted to receive the oil seal which is indicated in its entirety by the numeral 72.

In this embodiment, the casing 73 may be provided with an axially extending tubular shell which is threaded at 74 for receiving an outer tubular shell 75. The shell 75 and the shell 73 are each provided with beveled surfaces 76, 77 and a lead ring 78 may be confined between the beveled surfaces 76 and 77. Other forms of packing, such as leather, hemp, jute, or spring packing may be substituted for the lead under appropriate conditions and the shell 75 is provided with notches 79 for receiving a spanner wrench, whereby the shell 75 may be forced into engagement with the lead ring 78 and the lead ring expanded into oil tight and water tight engagement with the walls of bore 15.

Other details of the casing of the oil seal 72 may be substantially the same as that described with respect to Fig. 1 with the exception that in this embodiment the studs 21 are supported by a removable cover 80 and the springs 81 on studs 21 are compressed between cover 80 and internal expansion member 82. The internal expansion member 82 is similar in shape to the expansion member 36 previously described with respect to Fig. 1 and it cooperates with the leather packing 83 in the same manner.

The external expansion member is provided by a concave annular surface 84 formed on the end of shell 73 and the packing chamber is formed by a counter bore 85 which communicates with bore 86. The cover 80 is removable like the cover of Fig. 1, but the external surface 87 of the oil seal need not be ground to fit the bore 15 on account of the seal which is provided by the lead ring or packing 78.

In this embodiment the studs 21 are preferably provided with knife shaped ends 88, the edges 89 of the knife shaped ends extending in a radial direction so that the studs 21 effectively prevent rotation of the V-shaped packing 83, but the packing 83 may be fed in a radial direction along the knife edge 89. This permits the full utilization of the width of both of the frusto-conical flanges of the leather V-shaped packing 83.

The leather packing ring 83 is preferably resiliently supported by a felt packing ring 83a of the same shape on the side toward the expander 82. The felt packing ring 83a is preferably impregnated with any compound which will resist oils, so that the felt packing ring 83a provides a resilient packing for the leather ring 83. The felt ring is adapted to give more readily and permit the relatively sharp lips or edges on the leather ring to respond to fluid pressure more quickly.

The operation of the oil seal of Fig. 7 is substantially the same as that of Fig. 1, with the exception of the fact that the knife edges of the studs 21 do not prevent radial movement of the parts of the leather packing.

Referring to Figs. 10 and 11, these are views of a modification in which the supporting studs have been omitted and a different type of spring is utilized to make the oil seal more compact. The elements of the casing may be substantially the same as those described with respect to Fig. 1, and corresponding numerals have been applied with the exception that the studs and coil springs have been omitted and a new spring 90 has been employed.

The spring 90 preferably comprises a corrugated washer spring of annular form which may be constructed of spring steel or brass. The washer spring 90 is provided with relatively deep corrugations so as to provide a maximum of spring movement, and the upper corrugations 90 engage the end of the casing 19 while the lower corrugations 92 engage the internal spring member 41. The operation of the oil seal of Fig. 10 is substantially the same as the other oil seals previously described.

The present oil seals are capable of giving long service without necessity for replacement or repair and the leather packing is automatically fed into place edgewise to continuously present a new surface and maintain an oil tight contact with the moving shaft. The sharp lips on the packing maintain a better seal than packings of other shape, for the reason that the relatively thin lips of the packing are flexible and they are so arranged that they are forced into closer engagement with the shaft by the expansion members and by the exertion of pressure inside the packing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent is:

1. An oil seal comprising a casing, an internal expansion member slidably mounted in said casing, an external expansion member carried by said casing, a V-shaped leather packing confined between said expansion member and adapted to be expanded edgewise thereby, and resilient means for urging said expansion members toward each other, one of said expansion members being formed with radially extending lugs adapted to be slid axially and rotated into engagement with said casing to secure said oil seal in assembled relation, and bendable means carried by said casing for preventing rotation of said latter expansion member and preventing unintentional separation of the parts of said oil seal.

2. An oil seal comprising a casing member formed with a radial flange and a cylindrical flange, said cylindrical flange being formed with axially extending slots and circumferentially extending slots communicating with said axial slots, a pair of expansion members for said oil seal, and an expansible packing located between said expansion members and adapted to be expanded thereby, resilient means for urging said expansion members toward each other, one of said expansion members forming a cover, radial lugs carried by said cover for engagement in said circumferentially extending slots and ears carried by said cover for engagement in said axially extending slots when said ears are bent into predetermined position.

3. An oil seal comprising a metal casing formed with an aperture for passing a shaft, an annular expansion member surrounding said shaft and located in said casing, said annular expansion member being provided with a convex annular surface, a V-shaped leather packing having a pair of frusto-conical flanges joined along the line of a circle located about said shaft in said casing, said packing flanges being engaged by said expansion member on the inside of said packing adjacent its outer edges and a second expansion member engaging the annular apex of said V-shaped packing, whereby the packing is fed edgewise into engagement with the shaft, and a corrugated washer spring confined between said first expansion member and said casing for resiliently urging said expansion members together.

4. In an oil seal, the combination of a sheet metal casing of substantially cylindrical form, having an open end and a radially inwardly extending flange at the other end surrounding a circular bore, an expander in said casing having an axially extending tubular flange slidably mounted in said bore and having a radially extending flange formed with a substantially V shape in cross section, a V shaped leather packing in said casing having relatively sharp edges engaging the inside of said casing and adapted to engage a shaft extending through said bore, said lateral radial flange engaging inside the V shaped packing adjacent its edges, and a cover for said casing having a bore for receiving a shaft and having a V shaped groove of less angularity than said packing adapted to engage the apex of said V shaped packing to feed said packing edgewise into engagement with the wall of said casing and with a shaft in said bore.

5. In an oil seal, the combination of a sheet metal casing of substantially cylindrical form, having an open end and a radially inwardly extending flange at the other end surrounding a circular bore, an expander in said casing having an axially extending tubular flange slidably mounted in said bore and having a radially extending flange formed with a substantially V shape in cross section, a V shaped leather packing in said casing having relatively sharp edges engaging the inside of said casing and adapted to engage a shaft extending through said bore, said latter radial flange engaging inside the V shaped packing adjacent its edges, a cover for said casing having a bore for receiving a shaft and having a V shaped groove of less angularity than said packing adapted to engage the apex of said V shaped packing to feed said packing edgewise into engagement with the wall of said casing and with a shaft in said bore, and an annular spring confined between said expansion member and the end of said casing, said spring having alternately upwardly and downwardly extending formations for resiliently urging said expander into engagement with said packing.

In witness whereof, I hereunto subscribe my name this 31st day of July, 1931.

CHARLES W. MARSH.